Nov. 28, 1967  K. STOLL  3,354,894
VALVE MECHANISM
Filed Dec. 7, 1965  2 Sheets-Sheet 1

INVENTOR.
KURT STOLL
BY *Jethro Bauer*
ATTORNEY.

Nov. 28, 1967  K. STOLL  3,354,894
VALVE MECHANISM
Filed Dec. 7, 1965 2 Sheets-Sheet 2

INVENTOR.
KURT STOLL
BY *Jerome Bauer*
ATTORNEY.

United States Patent Office 3,354,894
Patented Nov. 28, 1967

3,354,894
VALVE MECHANISM
Kurt Stoll, Esslingen (Neckar), Germany, assignor to Kurt Stoll KG. Maschinen u Apparatebau, Neidlingen, Teck, Germany
Filed Dec. 7, 1965, Ser. No. 512,093
12 Claims. (Cl. 137—1)

ABSTRACT OF THE DISCLOSURE

A compact valve mechanism having its structure divided into parts that may be rotated relative to each other to quickly change its operation from normally open to normally closed, and a valve structure that provides a passage between selected ports and utilizes the servomechanism force produced by the pressurized fluid controlled by the valve structure to operate the valve structure.

---

This invention relates generally to a valve mechanism and more particularly pertains to a small and compact valve mechanism that requires a very small operating force.

Mechanically operated valves that control the flow of a pressurized fluid such as air usually require a large mounting space because of their large dimensions. Moreover, an even greater disadvantage associated with valves of this type is that they require a large operating force because the operating force usually has to overcome the force produced by the pressurized fluid acting on the valve members.

The desideratum of the present invention is to provide a valve mechanism for controlling the flow of a fluid such as air under pressure that requires an unusually small external operating force.

Another object of the present invention is to provide a valve mechanism that is small and compact and which, therefore, requires a relatively small area in which to be mounted.

A further object of the present invention is to provide a valve mechanism of the type described that can be utilized either as a normally open or a normally closed valve. Accordingly, the need to stock two different types of valves thereby is eliminated.

Still another object of the present invention is to provide a compact valve mechanism that may easily be changed from a normally open to a normally closed valve simply by rotating one portion relative to the other.

Still further objects and features of the invention reside in the novel details of construction that result in a valve mechanism that is positive in operation, that utilizes the force of the fluid moving through it to provide a mechanical advantage so that the same is rapidly responsive to a light actuating force applied thereto.

Figure 1:
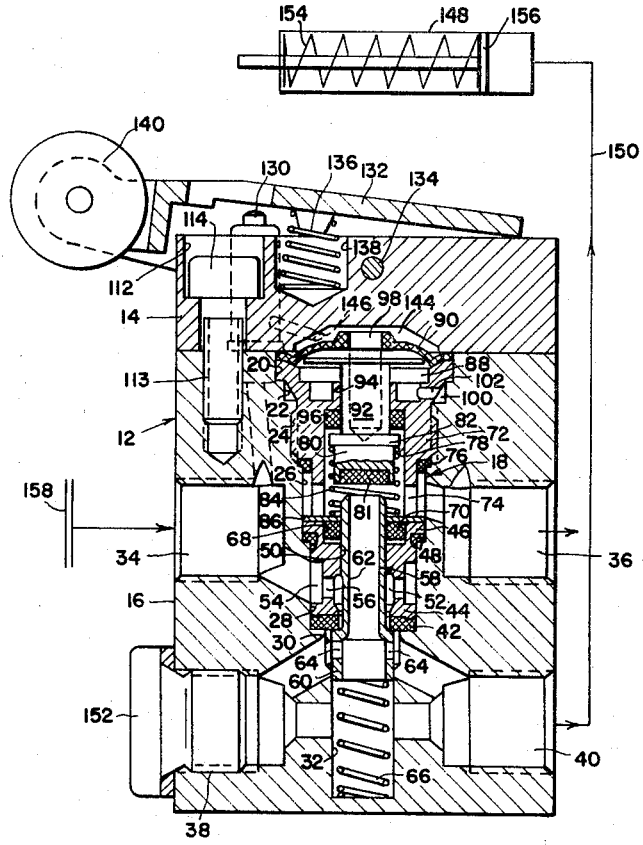
Figure 3:
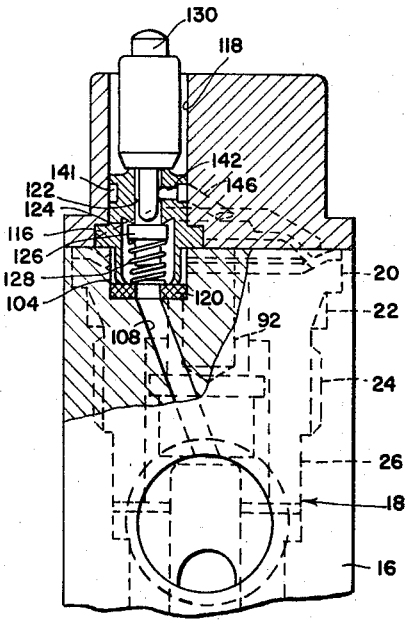
Figure 2:
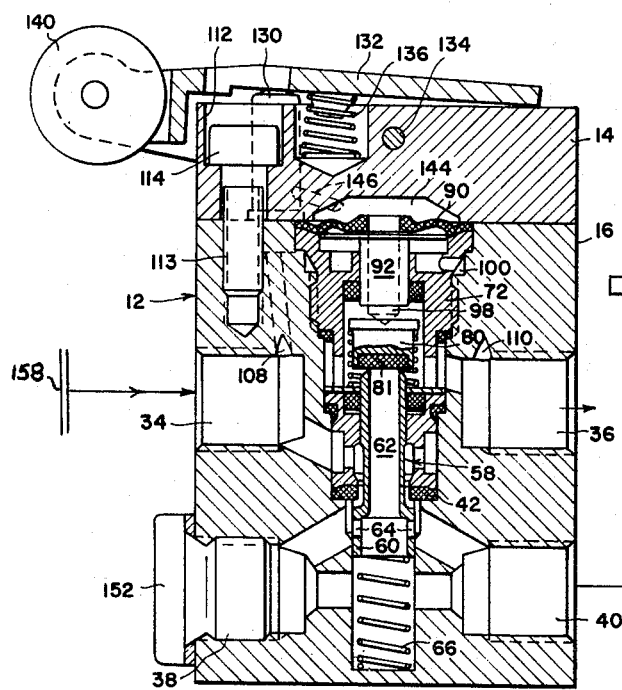
Figure 4:
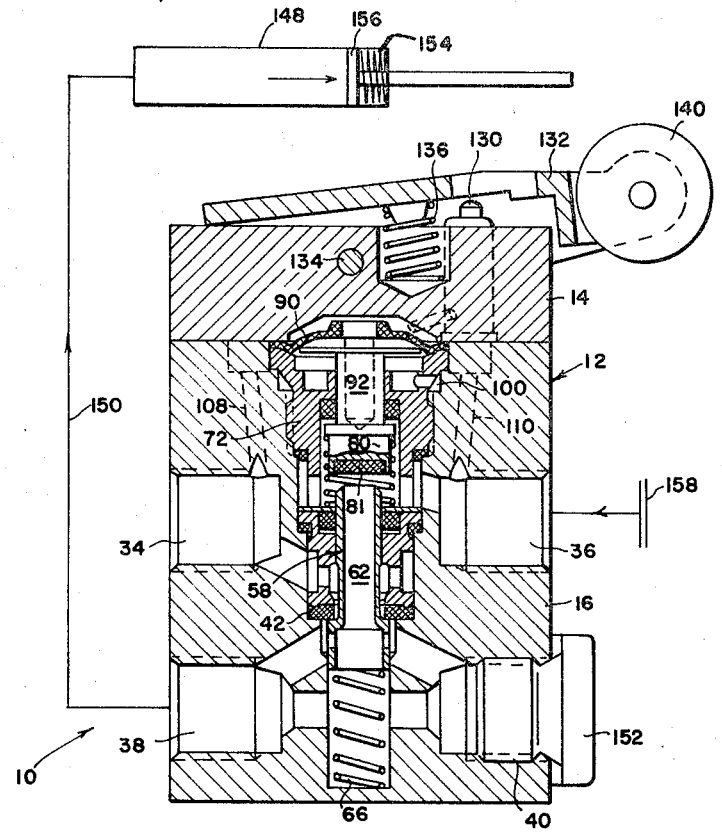
Figure 6:
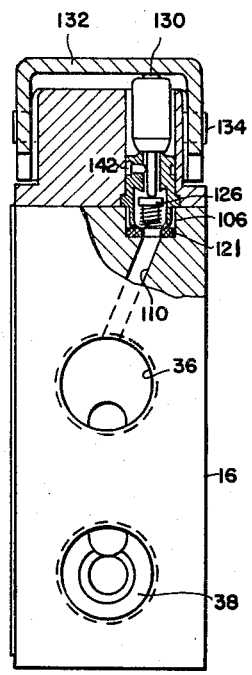
Figure 5:
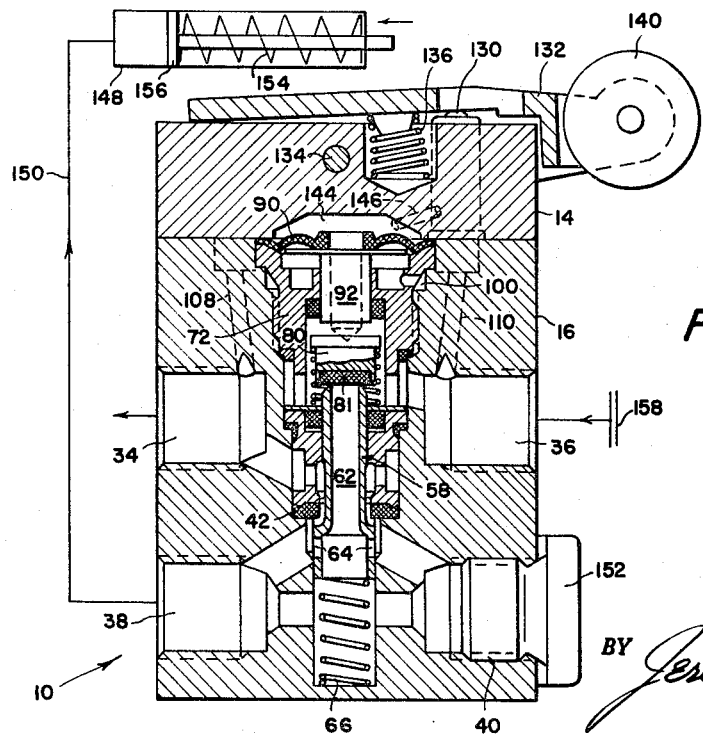

Other and further objects of this invention reside in the structures and arrangements hereinafter more fully described with reference to the accompanying drawings in which:

FIG. 1 is a vertical sectional view of a valve mechanism constructed in accordance with the present invention, illustrating the parts thereof oriented for the normally closed operation of the mechanism, FIG. 2 is a vertical sectional view of the valve mechanism of FIG. 1, illustrating the valve mechanism of the present invention in operated position, FIG. 3 is an enlarged fragmentary side view of the top portion of the valve shown in FIG. 1 with parts thereof broken away, FIGURE 4 is a vertical sectional view of a valve mechanism constructed in accordance with the present invention, illustrating the parts thereof oriented for the normally open operation of the mechanism, FIG. 5 is a vertical sectional view of the valve mechanism of FIG. 4, illustrating the valve mechanism in operated position, and FIG. 6 is a side elevational view of the mechanism in FIG. 4 with parts thereof broken away.

Referring now to FIGS. 1 to 3 of the drawings, the numeral 10 generally identifies the valve mechanism in its normally closed position and includes a valve body generally identified by the numeral 12, having an upper section 14 and a lower section 16. Provided in the lower section 16 is a central passage, generally identified 18, which is comprised of diametrically decreasing or stepped areas 20, 22, 24, 26, 28, 30 and 32, from the top to the bottom of the section 16 respectively. Opposed, internally threaded inlet ports 34 and 36 are provided in the lower section 16. Although the ports 34 and 36 have been designated as inlets, as the description proceeds, it will become clear that during the operation of the mechanism 12, one of the ports may be used as a fluid inlet while the other then will function as an exhaust. The ports 34 and 36 respectively communicate with areas 28 and 24 of the central passage 18. Spaced below the inlet ports in section 16 are opposed, internally threaded outlet ports 38 and 40 that communicate with sections 30 and 32 of the central passage 18.

A resilient washer 42 is received in area 28 of passage 18 and seats upon the shoulder defined by the areas 28 and 30. A stem support member 44 is similarly received in area 28 and seats upon the washer 42. The upper portion of the member 44 extends into area 24 of the passage 18 and is provided with a radial outwardly extending flange 46 that engages the walls of the area 26. A resilient member 48 is compressed between the flange 46 and the shoulder defined by areas 24 and 28 to provide an air tight seal therebetween. The washer 42 performs a similar function between the areas 28 and 30 of the passage 18. A central through bore 50 is provided in the member 44 and annular recesses 52 and 54 respectively provided on the inner and outer surfaces of the member. The recesses 52 and 54 communicate with each other through a transverse aperture 56 and are, in turn, in communication with the inlet port 34.

Slidably received in the through bore 50 and in the opening in the washer 42 is a valve stem 58 having an enlarged bottom 60 and a through axial passage 62. The enlarged bottom 60 extends through the area 30 and extends into area 32 of the passage 18 and it is provided with transverse openings 64 that connect the axial passage 62 simultaneously with both of the outlet ports 38 and 40. A spring 66 is received in the area 32 and constantly biases the stem 58 upwardly to cause the upper wall of the bottom section 60 to seat against the washer 42 to seal the washer opening. The upper portion of the valve stem 58 is slidably received through a washer 70 which is fixedly positioned in a central recess 68 in the top wall of the member 44. The washer 70 provides a seal which prevents any fluid in the chamber above the valve stem from entering the bore 50 in the member 44 from about the stem 58.

A plug member 72, having an external threaded central section, is received in the top areas of the central passage 18 in threaded engagement with a complementary threaded portion of the area 24. The member 72 extends downwardly from the top area 20 of the lower section 16 into the area 26 of central passage 18 and terminates in abutment with a washer 86 positioned on the member 44 and washer 70. The member 72 has a plurality of transverse openings 74 that provide communications between the hollow stem 58 and the inlet port 36. A resilient washer 76 is clamped between the member 72 and the shoulder defined by sections 24 and 26 to provide an airtight seal therebetween. The bottom wall of the member 72 is provided with a recess 78 that receives a reciprocable cap 80 so that the cap is fully movable therein. The cap 80 receives a resilient pad 81 in the bottom wall thereof that is normally spaced from but is adapted to seat on the upper edge of the stem 58 to seal the axial passage 62. The cap 80 is provided with a top radially extending flange 82. A spring 84 surrounds the stem 58 and the cap 80 and abuts the flange 82 at one end and the metal washer 86 at its other end while the stem 58 is movable therethrough. The spring 84 biases the cap 80 away from the stem 58 and into engagement with a sleeve 92 that is received in an axial bore 94 in the member 72. A washer 96 abuts the upper wall of the recess 78 and sealingly receives the sleeve 92 through the central aperture therein.

A chamber 88 is provided in the top surface of the plug member 72 and is sealed closed at its top by a diaphragm 90. A piston 98 is connected for movement with and depends from the diaphragm 90. The piston 98 extends through a central passage in the sleeve 92 and is slidable with respect thereto. As noted in detail below, the piston 98 is adapted to move or lower the cap 80 into sealing engagement with the valve stem 58. The side wall of the member 72 is spaced from the wall of the section 22 to define a relief chamber 100 therebetween. An opening 102 communicates with the chambers 88 and 100. An aperture (not shown) is provided in the side wall of the lower section 16 and connects the chamber 100 with the atmosphere so that the air in the chamber 88 can exhaust to the atmosphere.

Provided in the top wall of the lower section 16 of the valve mechanism 10 are similar recesses 104 and 106. Recess 104 is spaced above the port 34 while recess 106 is spaced above the port 36. FIG. 3 illustrates the position of the recess 104 relative to the port 34 when the port is utilized as the inlet. FIG. 6 illustrates the relative position of the recess 106 and the port 36 when the latter port is utilized as the inlet. A passage 108 connects the inlet port 34 with the recess 104; similarly, a passage 110 connects the inlet port 36 with the recess 106.

As shown in FIG. 1, the upper section 14 is provided with a through bore 112 that has an enlarged diameter upper portion. A bolt 114 is received through the bore 112 with the head of the bolt received in the enlarged diameter portion of the bore so that the bolt lies below the upper surface of the valve casing 12. The bolt 114 is in threaded engagement with a complementary threaded aligned opening 113 positioned adjacent to the left hand end wall of the lower section 16 to releasably clamp the upper and lower sections 14 and 16 together. The removal of the bolt 114 enables the separation of the top section 14 from the bottom 16. When the sections are separated, they may be rotated 180° relative to each other so that the valve mechanism 10 may be enabled to function as a normally open valve as in FIGS. 4 to 6, in a manner to be described. As noted above, when the top section 14 is oriented as shown in FIG. 1 with respect to the lower section 16, the valve mechanism 10 operates as a normally closed valve.

The lower section 16 additionally is provide with another threaded opening (not shown) like the first opening 113, but adjacent to the right-hand end wall of the valve body 12. This other threaded opening is positioned to be in alignment with the bore 112 when the upper section 14 is rotated 180° from the orientation shown in FIG. 1 to the orientation shown in FIG. 4. Accordingly, the bolt 114 is adapted to be threadedly received in this other opening to releasably clamp the upper and lower sections 14 and 16 together in the position shown in FIG. 4. Thus, when the upper section 14 is oriented as shown in FIG. 4 with respect to the lower section 16, the valve mechanism 10 operates as a normally open valve.

Also provided in the upper section 14 is a through bore 118 that fixedly receives a hollow sleeve 116 therein (FIGS. 3 and 6) in air-tight engagement with the walls of the bore. The hollow sleeve 116 is provided with a bottom portion which extends below the upper section 14 and which is received in the recess 104 when the upper and lower section are oriented as shown in FIGS. 1 to 3. A washer 120 abuts the bottom wall of the recess 104 and the bottom edge of the sleeve 16 to provide a seal therebetween. The sleeve 116 is positioned in the upper section 14 so that the bottom portion thereof will similarly be received in the recess 106 when the upper and lower sections of the valve casing 12 are oriented and rotated 180° as shown in FIG. 4. A washer 121 (FIG. 6) is similarly provided in the recess 106 to provide a seal between the bottom wall of the recess and the sleeve 116.

The sleeve 116 has an axial through bore 122 that includes an upper section of reduced diameter which defines an inclined shoulder 124 with the bottom section thereof. Received within the bottom section of the bore 122 is a poppet valve comprising a piston 126 and a spring 128 that normally biases the piston into engagement with the shoulder 124 to effectively seal the upper section of the bore 122. A pin 130 is slidably received in an upper extension of the sleeve 116 and projects above the upper surface of the upper section 14. The pin 130 is adapted to be depressed thereby to unseat the piston 126 to open the poppet valve. Movement of the pin 130 is effected by a lever 132 of inverted U-shape that is pivotally connected at its sides to the upper section 14 by a pivot pin 134. A spring 136 which is received in a recess 138 in the upper section 14 normally biases the lever 132 up and away from the pin 130. The forward end of the lever 132 extends beyond the end wall of the casing 12 and has a roller 140 rotatably mounted thereto. The roller 14 is adapted to be engaged by a cam member, in the conventional manner, to pivot lever 132 about the pin 134 thereby to depress the pin 130.

Provided on the external wall of the sleeve 116 above the shoulder 124 is an annular recess 141 that communicates with the central bore 122 through a transverse passage 142. Centrally located in the bottom wall of the upper section 14 is a recess that overlies the diaphragm 90 and defines a chamber 144 therebetween. A passage 146 connects the recess 141 with the chamber 144. Accordingly, when the poppet valve 126 is opened, the inlet port 34 communicates with the chamber 144 through the passage 108, bore 122, transverse passage 142, annular recess 140 and the passage 146.

In operation, either the outlet port 38 or 40 may be connected to the device to be operated. Thus, as shown in FIGS. 1 and 2, the device to be operated, which may comprise a single-acting pump 148, is connected to the outlet port 40, for illustrative purposes only, by appropriate conduit means indicated diagrammatically by a line 150. The other outlet port 38 is sealed by a plug 152. The pump 148 is of conventional design and is of the type wherein a spring 154 normally biases a piston 156 to the right, as taken in FIGS. 1 and 2, and wherein a pressurized fluid entering the piston cylinder through the line 150 causes the piston to move toward the left. A source of pressurized fluid such as compressed air indicated diagrammatically at 158, is connected to the inlet port 34.

As noted above, when the upper and lower sections of the valve casing are oriented as illustrated in FIGS. 1 to 3, the valve mechanism 10 functions as a normally closed valve and, accordingly, controls the actuation of the pump 148. That is, the pressurized fluid from the source 158 does not communicate with the line 150 until the valve mechanism 10 is actuated by the lever 132. More particularly, until the lever is actuated, the pressurized fluid flows through the inlet port 34 and through the appropriate passages to the annular recess 54, through apertures 56 to 52 and downwardly between the outer surface of the stem 58 and the support member 44. However, the further flow of fluid is terminated at the seating engagement between the valve stem 58 against the washer 42 to prevent the fluid from flowing therebeyond. Additionally, the pressurized fluid flows upwardly through the passage 108 and into the lower area of the sleeve 116. The closed poppet valve 126 prevents the fluid from reaching therebeyond or to the annular recess 140 in the sleeve.

When it is desired to operate the pump 148, the lever 132 is pivoted downwardly thereby depressing the pin 130 and unseating the piston 126. A servomechanism effect is now created whereby the pressurized fluid that flows upwardly between the valve 126 and the seat 124, through the passage 142, about the recess 140, and down the passage 146 into the chamber 144 is utilized to operate or actuate the diaphragm 90. It is to be understood that when the pin 130 is depressed, the upper end of the bore 122 is automatically sealed to prevent the fluid from exhausting to the atmosphere. The fluid pressure in the chamber 144 exerts a servo or downward force on the diaphragm 90 thereby causing the diaphragm and the piston 98 connected thereto to move downwardly. The air in the chamber 88 is permitted to exhaust to the atmosphere through the passages 100 and 102 noted above. The piston 98 moves the cap 80 downward against the bias of the spring 84 until the pad 81 engages the valve stem 58 and seals closed the top of axial passage 62 therein. Thereafter, further downward movement of the piston 98 causes the valve stem 58 now to move down against the bias of the spring 66. This further movement unseats the lower portion 60 of the valve stem from the washer 42. Hence, the valve elements will now be in the positions illustrated in FIG. 2 wherein the pressurized fluid in then free to flow between and through the aperture in the washer 42 and the narrow stem 58 directly to the outlet port 40. Thus, the pressurized fluid flows through the line 150 and into the piston cylinder of the pump 148 to cause the piston 156 to move to the left.

When the lever 132 is released, the spring 136 biases the lever back to its normal position. Rotation of the lever about the pivot pin 134 is limited by the engagement of the end of the lever opposite the roller with the top surface of the valve casing 12. The spring 128 biases the piston 126 into engagement with the shoulder 124 to close the poppet valve and prevent flow of the pressurized fluid to the chamber 144. The pin 130 returns to its normal position thereby opening the upper end of bore 122 to the atmosphere to allow the fluid in the chamber 146 to exhaust to the atmosphere and thereby to decrease the force on the diaphragm 90. The force constants of the springs 66 and 84 are arranged so that the spring 66 exerts a much greater biasing force than does the spring 84. Thus, when the force on the diaphragm 90 is removed, the spring 66 immediately biases the valve stem 58 into engagement with the washer 42 to close the flow of fluid to the outlet port 40. Thereafter, the spring 84 biases the cap 80 upwardly to open the axial passage 62. The cap 80 moves upwardly until it again abuts the sleeve 92 thereby moving the piston 98 and the diaphragm 90 back to their normal positions, as shown in FIG. 1. The spring 154 biases the piston 156 back to its normal position to force the fluid in the piston cylinder through the line 150, outlet port 40, aperture 64, the axial passage 62, and through the inlet port 36 to the atmosphere. For this operation of the valve mechanism 10, the port 36 functions as an exhaust port.

As a feature of the novel details of construction of the device of the present invention, it is noted that the force of the pressurized fluid is utilized as a servomechanism to actuate the valve elements. The only external force required is that needed to open the poppet valve. Thus, since the valve does not have to withstand the large forces normally applied to valves of the prior art, the present valve mechanism may be built as a compact device thereby reducing space considerations to a minimum.

As noted above, the upper section 14 may be oriented or rotated 180° with respect to the lower section 16 from the position shown in FIGS. 1 to 3 to that shown in FIGS. 4 to 6 to reverse the operation of the valve mechanism 10 from a normally closed to a normally open valve mechanism. Thus, when the sections 14 and 16 are rotated 180° relative to each other, the former inlet port 34 will now function as an exhaust as did the port 36 and the port 36 now functions as the inlet by being connected directly to the source of fluid pressure 158. In the normally open operation of FIGS. 4 to 6, the valve neck 10 may utilize either one of the outlets 38 or 40. However, to demonstrate the versatility of the invention, the plug 152 formerly blocking the outlet 38 has been placed into outlet 40 so that the pump 148 may be operated by way of the new outlet 38.

Because the valve mechanism 10 is now reversed and is in its normally open position, fluid entering inlet 36 passes unobstructedly into the central passage 18, beneath the cap 80 and its pad 81, downward through the passage 62 of the stem 58 and from there outwardly through the openings 64 to the outlet 38. This, in turn, causes the piston 156 normally to assume the position shown in FIG. 4 wherein the same constantly exerts a force against the spring 154 because the communication of fluid from the supply 158 to the pump 148 is normally open. At the same time, fluid at the inlet 36 is communicated to the bore 122 of the poppet valve or servo valve mechanism by way of passage 110.

When it is desired to move the piston 156 to the left, as taken in FIG. 4, the lever 132 is actuated downwardly to actuate or depress the pin 130 and open the poppet valve by unseating the element 126. Thus, the force of the pressurized fluid from the inlet 38 and passage 110 is again used to move the cap 80 downward into sealing engagement with the valve stem 58 in the manner noted above. The passage 62 thereby is closed to prevent the flow of the fluid from the inlet 38 to the pump 148. Further, downward movement of the valve stem 58 unseats the portion 60 of the valve stem from the washer 42 and provides a passage for the fluid in the pump 148, to exhaust therefrom through the aperture in the washer 42, up and about the annular recesses 52 and 54 and then out the port 34 that may vent the fluid to the atmosphere or any desired device that may be connected therewith. The piston 156 then moves to the left under the bias of the spring 154 as shown in FIG. 5.

The release of the lever 132 removes the force on the pin 130 to enable the piston 126 to close so that inlet fluid can no longer be communicated to the diaphragm for its operation. The spring 66 causes the valve stem 58 to seat on the washer 42 to close the exhaust passage. Thereafter, the spring 84 causes the cap 80 to open the passage 62. The pressurized fluid then flows through the passage 62 to the pump 148 to again move the piston 156 to the right (FIG. 4) and maintain the piston in this position until the valve mechanism is operated again.

Accordingly, a novel valve construction has been provided which utilizes the servomechanism force produced by the pressurized fluid controlled by the valve to operate the valve elements thereby reducing considerably the external force necessary to actuate the valve mechanism. Additionally, the valve of the present invention is adapted to be used as either a normally closed or a normally open valve to increase the versatility of the valve mechanism and reduce the number of valves required for stock purposes.

While there have been shown and described and pointed out the fundamental novel features of the invention as applied to a preferred embodiment thereof, it will be understood that various omissions and substitutions and changes in the form and details of the device illustrated and in its operation may be made by those skilled in the art, without departing from the spirit of the invention. It is the intention, therefore, to be limited only as indicated by the scope of the claims appended hereto.

I claim:
1. A valve mechanism comprising
a valve body,
at least one outlet port in said valve body,
a first and a second port in said valve body adapted to be connected to a fluid under pressure,
valve means in said valve body movable between a first and a second position to control the flow of a fluid through said valve mechanism,
said valve means providing a passage between said first port and said outlet port and preventing the flow of fluid between said second port and said outlet port when in the first position, and providing a passage between said second port and said outlet port and preventing the flow of fluid between said first port and said outlet port when in the second position,
biasing means in said valve body for biasing said valve means to said first position,
valve operating means for moving said valve to the second position, and means selectively actuatable to communicate fluid under pressure from said first and second ports to said valve operating means to operate the same.

2. A valve mechanism as in claim 1,
wherein said valve means includes a valve stem slidably received in said valve body,
a central passage in said valve stem communicating with said first port and said outlet port,
said valve means further including a cap slidably received in said valve body and responsive to the operation of said valve operating means for sealing said central passage in said stem.

3. A valve mechanism as in claim 1,
and another outlet port in fluid communication with said one outlet port,
and means for sealing a preselected one of said outlet ports.

4. A valve mechanism as in claim 1,
wherein said valve operating means is responsive to a pressurized fluid for moving said valve means to the second position,
connecting means for connecting said valve operating means to a source of pressurized fluid,
a normally closed poppet valve in said connecting means for preventing the flow of the pressurized fluid to the valve operating means,
and actuating means mounted on said valve body and being operable to open said poppet valve.

5. A valve mechanism as in claim 4,
wherein said connecting means comprises a passage communicating with said valve operating means and selectively with one of said first and second ports.

6. A valve mechanism as in claim 4,
wherein said valve body has an upper and a lower section and wherein said upper section is mounted for orientation in a plurality of positions relative to said lower section,
and wherein said connecting means includes a passage in said upper section communicating with said first port and said valve operating means for one position of orientation of said upper section relative to said lower section,
said passage in said upper section communicating with said second port and said valve operating means for another position of orientation of said upper section relative to said lower section.

7. A valve mechanism as in claim 2,
wherein said valve operating means comprises a diaphragm in said valve body movable between a plurality of positions,
and means depending from said diaphragm and movable therewith to move said valve means to said second position in response to fluid pressure applied to said diaphragm to move the same from one of its positions to another.

8. A valve mechanism as in claim 1,
and a central bore in said valve body providing a passage communicating with said first and second ports and outlet port,
sealing means in said central bore for preventing the flow of fluid between said first and second ports,
said valve means including a valve stem slidably received in said sealing means and having a central passage therein,
said central passage communicating with said first port and said outlet port when said valve means is in said first position,
a valve seat in said central bore,
and a section on said valve stem engageable with said valve seat when said valve means is in said first position to seal the passage between said second port and outlet port,
said valve means further including a cap spaced relative to said valve stem when said valve means is in the first position,
said cap being moved into engagement with said valve stem to seal the central passage therein and to unseat the valve stem when said valve means is moved to the second position.

9. A valve mechanism as in claim 8,
and a spring in said valve body for biasing said cap out of engagement with said stem and into engagement with said valve operating means,
said valve means sequentially sealing the passage between said first port and outlet port and opening the passage between said second port and outlet port when the valve means is moved to said second position.

10. In a valve mechanism,
a body,
outlet means in said body,
inlet means in said body to communicate fluid under pressure to said body,
passage means in said body to communicate fluid between said inlet means and said outlet means,
exhaust means connected with said passage to exhaust fluid from said outlet means when said valve means is moved to a position to close the communication of fluid between said inlet and outlet means,
valve means in said passage movable between two positions alternately to open and close a communication of the fluid between said inlet means and said outlet means,
means operable in response to the fluid pressure at said inlet means to move said valve means to one of said two positions,
and means actuatable to selectively communicate the fluid at said inlet to said operable means to operate the same wherein said inlet means and exhaust means are reversible, said body having a plurality of sections, means to releasably secure said sections together in reversible positions to reverse the operations of said inlet and exhaust means,
an actuator on one of said sections,
said passage and operable means in another of said sections, and
connecting means at each of said inlet and exhaust means whereby when said sections are secured together in one position said inlet means is adapted to communicate fluid under pressure to said outlet means and said actuator actuates siad actuatable means to communicate the fluid at said inlet means with said operable means and when said sections are secured together in a reverse position said exhaust means becomes the inlet means adapted to communicate fluid under pressure to said outlet means and said inlet means becomes the exhaust means to exhaust fluid from said outlet means and said actuator actuates said actuatable means to communicate the fluid at said reversed exhaust means with said operable means.

11. In a valve mechanism as in claim 10,
another outlet means in said body in fluid communication with said first mentioned outlet means,
and means for closing one of said outlet means.

12. In a method for controlling the flow of fluid under pressure, the steps comprising
connecting a port with the fluid under pressure,
providing for a communication of the fluid under pressure from the port to the outlet,
alternately closing and opening the communication of the fluid under pressure from the port to the outlet,
utilizing the fluid under pressure at the port to alternately open and close the communication of fluid from the port to the outlet, communicating the fluid under pressure from the outlet to exhaust the fluid therefrom to another port after the communication from the first mentioned port to the outlet is closed and closing the communication from the outlet to the other port before opening the communication from the first mentioned port to the outlet,
disconnecting the first mentioned port from the fluid under pressure and connecting the other port with the fluid under pressure, and utilizing the fluid under pressure at the other port to alternately open and close the communication from the other port to the outlet,
and reversely opening and closing respectively a communication of the fluid under pressure from the outlet to exhaust the same to the first mentioned port after the communication from the other port to the outlet has completely closed.

References Cited

UNITED STATES PATENTS

| | | | |
|---|---|---|---|
| 435,488 | 9/1890 | Elton | 137—271 |
| 1,802,324 | 4/1931 | Bartlett | 137—630.22 X |
| 2,372,311 | 3/1945 | Brown | 137—627.5 X |
| 2,617,444 | 11/1952 | Gardner | 137—625.64 |
| 2,902,052 | 9/1959 | Ohlsson | 137—624.64 |
| 3,016,065 | 1/1962 | Stampfli | 137—625.64 |

FOREIGN PATENTS

| | | |
|---|---|---|
| 911,771 | 11/1962 | Great Britain. |
| 937,061 | 9/1963 | Great Britain. |

M. CARY NELSON, *Primary Examiner.*

R. J. MILLER, *Assistant Examiner.*